Oct. 9, 1973   J. R. HIND   3,764,468
THERMAL INSULATION FOR THE SURFACE OF A CONTAINER FOR
A LIQUID METAL COOLED NUCLEAR REACTOR
Filed Feb. 11, 1970   3 Sheets-Sheet 1
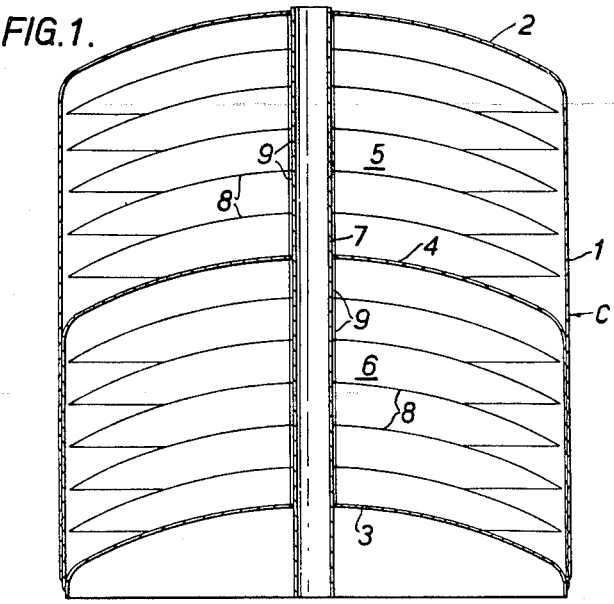
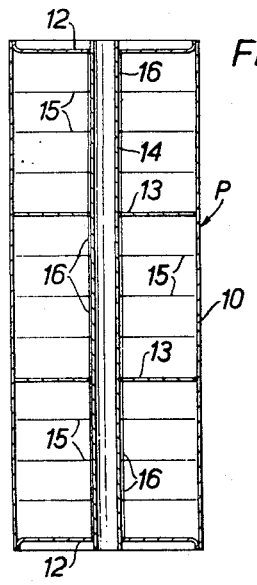
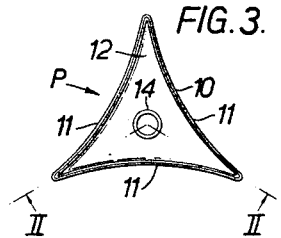
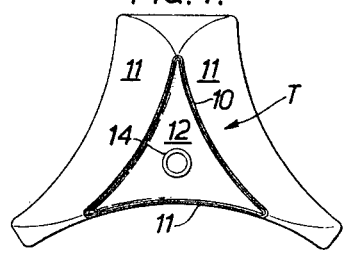

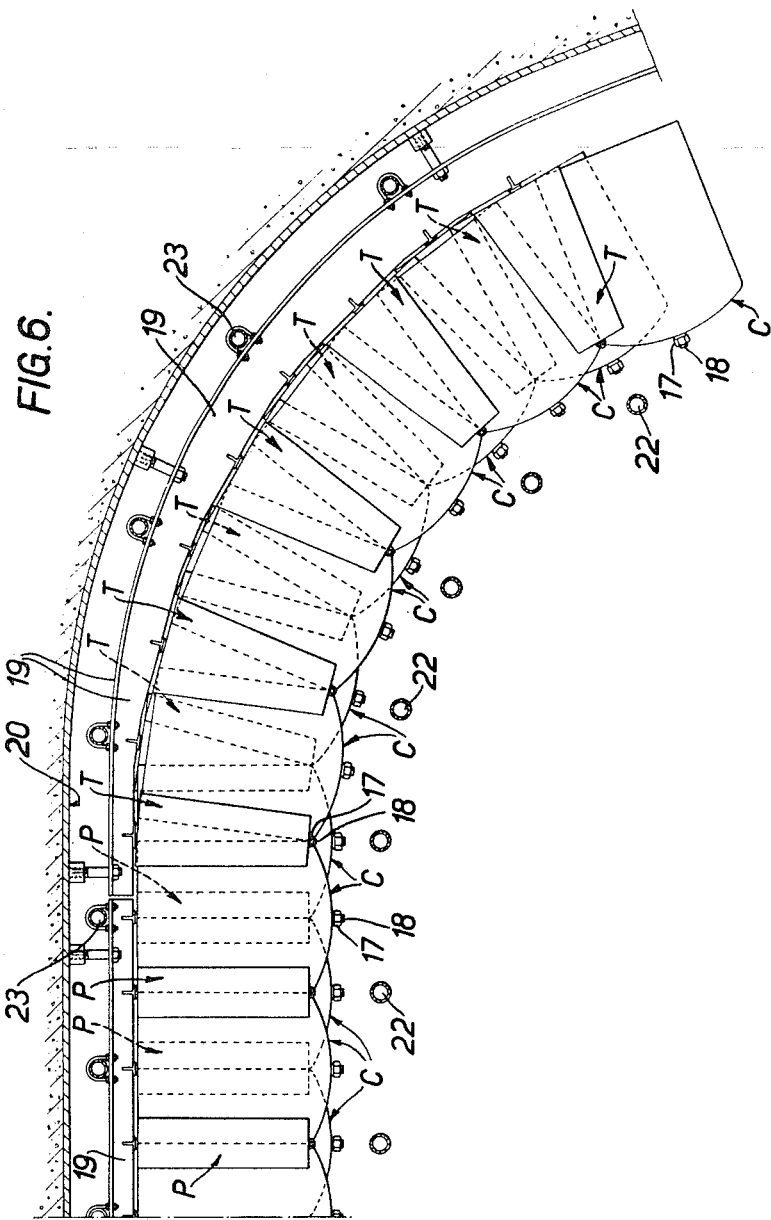

United States Patent Office 3,764,468
Patented Oct. 9, 1973

3,764,468
THERMAL INSULATION FOR THE SURFACE OF A CONTAINER FOR A LIQUID METAL COOLED NUCLEAR REACTOR
John Richard Hind, Warrington, England, assignor to United Kingdom Atomic Energy Authority, London, England
Filed Feb. 11, 1970, Ser. No. 10,461
Claims priority, application Great Britain, Feb. 20, 1969, 9,361/69
Int. Cl. G21c *11/08*
U.S. Cl. 176—40                                       7 Claims

ABSTRACT OF THE DISCLOSURE

A thermal insulation assembly for the inside surface of a container for a liquid metal cooled nuclear reactor comprises a multiplicity of gas filled and sealed cylindrical containers mounted side by side with their longitudinal axes normal to the surface, the spaces between the cylindrical containers being occupied by gas filled and sealed prismatic containers conforming in shape to the spaces between the cylindrical containers, the surfaces of the cylindrical containers being spaced by a small amount from the corresponding surfaces of the prismatic containers.

BACKGROUND OF THE INVENTION

This invention relates to thermal insulation comprising gas filled sealed bodies, for insulating the inside surface of a container for a liquid metal cooled nuclear reactor.

SUMMARY OF THE INVENTION

According to the invention a thermal insulation assembly for an internal surface of a container for a liquid metal cooled nuclear reactor comprises a multiplicity of separate gas filled and sealed containers located in juxtaposition to said surface, the surfaces of adjacent containers conforming to each other so as to limit passages of fluid communication from one side of the assembly to the other.

In a particular form such a thermal insulation assembly comprises a multiplicity of cylindrical containers assembled side by side with their longitudinal axes normal to said surface, the spaces defined between the cylindrical containers being occupied by gas filled and sealed prismatic containers conforming in shape to the spaces defined between the cylindrical containers, the surfaces of the cylindrical containers being spaced by a small amount from the corresponding surfaces of the prismatic containers.

The containers may each have a plurality of transverse thermal baffles therein for reducing transfer of heat by convection and radiation.

Each container may be divided transversely into at least two separate compartments to provide a measure of continued thermal insulation performance should local breaching of a compartment occur.

The cylindrical containers may have curved ends, e.g. domed tops and dished bases so as to be resistant to crushing.

DESCRIPTION OF THE DRAWINGS

A constructional embodiment of the invention will now be described by way of example with reference to the accompanying drawings, wherein FIG. 1 is an enlarged side view in medial section of a single component in the form of a sealed, gas-filled, tubular body for a thermal insulation assembly, FIG. 2 is a similarly enlarged view, in section on line II—II of FIG. 3, to that of FIG. 1 and illustrates a second component for said assembly, FIG. 3 is a plan view of the component shown in FIG. 2.

FIG. 4 is a similarly enlarged view to that of FIG. 1, being a plan view and illustrating an alternative to the component shown in FIGS. 2 and 3, FIG. 6 is a reduced plan view of a portion of the assembly applied to a curved surface in a containing vessel.

DESCRIPTION OF THE PREFERRED EMBODIMENTS

Figure 5:
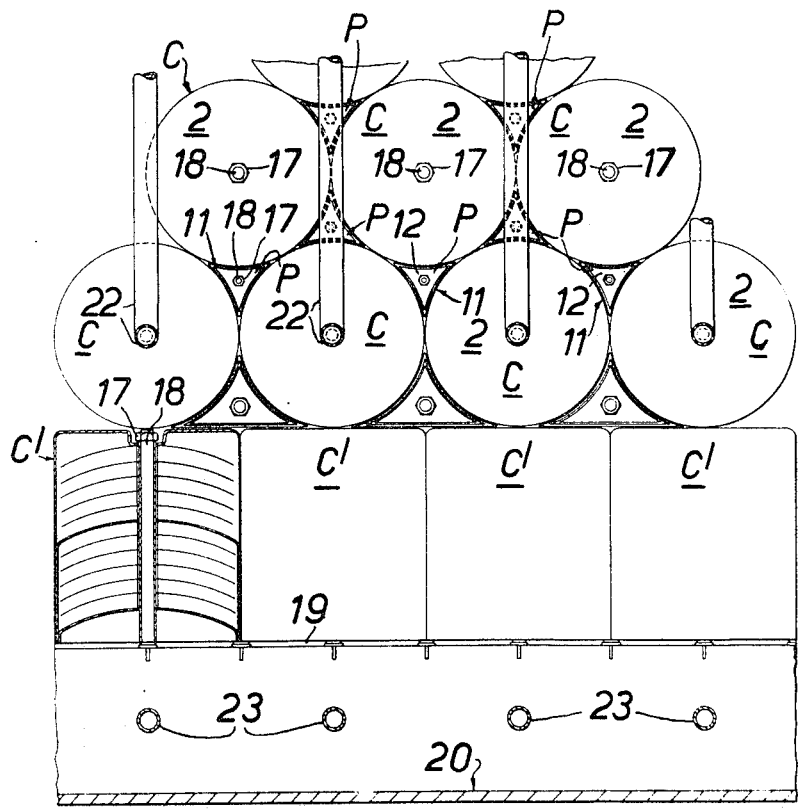
FIG. 5 is a reduced elevation of a portion of assembled thermal insulation for the base and wall of a container.

Referring to the drawings, in the construction of thermal insulation illustrated therein, the thermal insulation is designed for application to the containing vessel of a large power producing, sodium-cooled fast breeder reactor which has the feature that the sodium pool (in which the reactor core is submerged) is contained within a vessel formed by a frozen layer of sodium supported by a structure constituted by a metal-lined concrete vault, the thermal insulation being required to bring about a steep temperature gradient from one side to the other, with the aid of cooling loops on either side thereof. Typically the temperature of the sodium pool is 450° C. and the temperature of the frozen sodium layer is 50° C. A typical example of the construction of reactor for which the illustrated thermal insulation has been designed is described and shown in FIGS. 2 and 3 of the Complete Specification of co-pending U.S. Continuation Ser. No. 187,183, filed Oct. 6, 1971, now abandoned; in those figures, the thermal insulation is illustrated diagrammatically.

FIG. 1 of the present drawing shows, enlarged compared with FIGS. 5 and 6, a component C of the thermal insulation assembly, the component C consisting of a generally cylindrical pressure-resistant shell 1 having integrally a torospherical outer end 2 arranged convexly a separate torospherical inner end 3 arranged concavely and welded to the shell 1, and a torospherical partition 4 within the shell 1 and dividing the interior of the shell 1 into two sealed compartments 5 and 6, each containing argon under pressure. Extending axially in the shell 1 is a tube 7 penetrating and sealed by welding in, the ends 2 and 3 and the partition 4. Within each compartment 5 and 6 and arranged on the tube 7 is disposed thermal baffling in the form of a plurality of curved sheets 8 for discouraging transfer of heat by convection and radiation. The sheets 8 are spaced along the tube 7 by a plurality of spacing tubes 9 on the tube 7. The shell 1 is not truly cylindrical, but tapers slightly from the base, for a reason which will subsequently be explained in relation to the assembly of components for the thermal insulation structure. Typically, for the duty hereinbefore set forth, the component C is 46.9 cm. overall height, 40.54 cms. diameter at the base and 40.1 cms. diameter at the top, with the radius of the top, partition and base being 40 cms. The shell metal is 1.6 mm. thick stainless steel, and the sheets 8 are the same material 0.25 mm. thick. Argon gas pressure is 35 p.s.i.g. at 20° C.

FIGS. 2 and 3 show a prismatic component P for the thermal insulation assembly, being formed from a pressure-resistant shell 10 with curved sides 11 (FIG. 3), dished ends 12, and partitions 13. An axially arranged tube 14 penetrates and is sealed in the ends 12 and partitions 13, and thermal baffling in the form of discs 15, spaced by tubes 16 on the tube 14, is provided within the shell 10, which also contains argon under pressure. Each component P, for the same duty as the components C, and with the axis of its tube 14 at the centre of an equilateral triangle of side 40.64 cm. (equals the triangular pitch of the components C in the assembly shown in FIG. 5 subsequently explained), has its curved sides struck from the corners of the triangle with a radius of 20.37 cms., the corners of the component P being 3.2 cms. perpendicularly from the sides of said triangle. The material and thickness of shell 10, ends 12 and partitions 13 are the same as those of shell 1 and partition 4 of component C, and the discs 15 are the same material and thickness as the sheets 8 of component C. The argon filling pressure is the same as for component C.

FIGS. 5 and 6 show how the two components C, P, are arranged to form an assembly. The components C are arranged on a 40.64 cms. triangular lattice with the shell 1 of each component C just clear at the base by a nominal 1 mm. of the bases of six other shells 1. The interspaces between shells 1 are occupied by the prismatic components P, the walls 11 thereof being just clear by a nominal 1 mm. at the bases of cylindrical walls of adjacent shells 1. The tubes 7, 14 of the shells 1, 10 respectively are employed to secure the components in assembled position, by nuts 17 and spindles 18 extending therethrough and secured on the inner side of the assembly to a framework 19 of angle iron and T-bar construction, the framework 19 serving for location and securing of the assembly relative to the surface to be protected (designated 20 in FIGS. 5 and 6). Where the container changes from wall to base, those components C on the base which lie under the lowermost components C on the wall have flattened tops (FIG. 5) to accommodate the horizontally extending components C.

Where the surface to be protected is curved in a single plane, components such as that illustrated in FIG. 4 and designated T may be employed. Each component T is similar to that shown in FIGS. 2 and 3 (similar reference numerals designating similar parts) except that it tapers significantly from a base wider than that of the shell 10 of FIGS. 2 and 3 to a top similar to top 12 of said shell 10, enabling concavely curved vessel walls to be followed by employing the components T between the generally cylindrical components C as shown in FIG. 6.

FIGS. 5 and 6 also show the disposition of the pipes of cooling loops which assist in obtaining the required temperature difference across the assembly to bring about, in the particular application of the thermal insulation described, the formation of a frozen sodium layer between a metal lined concrete wall forming the surface 20 to be protected, and the boundary of the "cold" face of the thermal insulation assembly. The "cold" leg 23 of each loop is disposed on the "cold" side, between the thermal insulation assembly and the surface 20, and the return, "hot" legs 22 of each loop is disposed on the "hot" side of the thermal insulation assembly. The loops are filled with sodium/potassium alloy and air cooled in coolers (not shown).

The reason for the slight taper of the shells 1 of components C is as follows: for the mean thermal conductance of the assembly to be maintained within the specific requirements of the frozen sodium layer system, the sodium gap between the components must be closely controlled, and must not exceed a mean value of 1 mm. at design temperature conditions, which are 450° C. at the "hot" face and 50° C. at the "cold" face. Thermal expansion is accommodated by the provision of the said slight taper such that the walls of the components expand to become parallel with a nominal 1 mm. clearance when the design temperature gradient is applied. If the components C were not provided with the said slight taper, thermal expansion could result in collapse of the components by buckling. The mean conductance of the assembly can therefore be seen to be a function of the mean temperature of the insulation, and, unlike most insulating systems, decreases with increasing temperature. This inherent characteristic reduces the temperature variation of the frozen sodium layer and of the surface to be protected (the metal-lined concrete vault). This is an important advantage of the hereinbefore described thermal insulation structure.

Other important advantages of the particular described embodiment and its application lie in the fact that the thermal insulation structure hereinbefore described is capable of producing a high temperature drop across the structure without exceeding allowable stress limits, and if local mechanical failure should occur, it will be locally confined and not self-propagating. Further advantages include interchangeability of single components, in the event of failure or damage, and the ability to effect workshop fabrication of individual components with only assembly on site, compared with earlier proposals for thermal insulation which require fabrication, including welding, on site.

I claim:
1. The combination of a liquid metal cooled nuclear reactor and thermal insulation comprising:
    (a) a containing vessel containing liquid metal,
    (b) a liquid metal cooled reactor core structure in said vessel and submerged in said liquid metal, and
    (c) thermal insulation applied to the inside surface of said vessel,
in which:
    (i) said insulation comprises a multiplicity of separate, gas-filled, sealed tubular bodies having their longitudinal axes normal to said inside surface
    (ii) the surfaces of adjacent bodies conform to each other and
    (iii) there is a minimal spacing between adjacent bodies to provide a restricted passage for permeation of the insulation by liquid metal.

2. The combination as claimed in claim 1 in which said bodies are of two shapes arranged on parallel axes, the first shape being nominally cylindrical and the bodies of that shape being arranged on a triangular lattice so as to be closely spaced from one another and the other shape conforming to the interstitial spaces between the cylindrical bodies.

3. The combination as claimed in claim 2 in which the nominally cylindrical bodies have a slight taper when devoid of temperature gradient across the insulation, the taper being inwardly in the direction from the cool to the hot side of the insulation.

4. The combination as claimed in claim 2, including a curved section on said inside surface in which, on said curved section, the interstitial bodies have a taper to conform with the tapered interstitial spaces between the cylindrical bodies, created by virtue of the cylindrical bodies being arranged for mounting with their axes normal to the curved surfaces.

5. The combination as claimed in claim 1 having a plurality of transverse thermal baffles in the bodies.

6. The combination as claimed in claim 1 having transverse dividing means within the bodies to divide the bodies into separate compartments.

7. The combination as claimed in claim 2 in which the cylindrical bodies have domed ends, the ends in the cool side of the insulation being concave and on the hot side convex.

References Cited
UNITED STATES PATENTS

| 3,297,189 | 1/1967 | Carrasse | 165—136 X |
| 3,357,890 | 12/1967 | Friis et al. | 176—87 X |
| 3,421,977 | 1/1969 | Hutchinson et al. | 176—40 |
| 3,488,255 | 1/1970 | Hayden et al. | 176—87 X |

REUBEN EPSTEIN, Primary Examiner

U.S. Cl. X.R.
165—135; 176—87